UNITED STATES PATENT OFFICE.

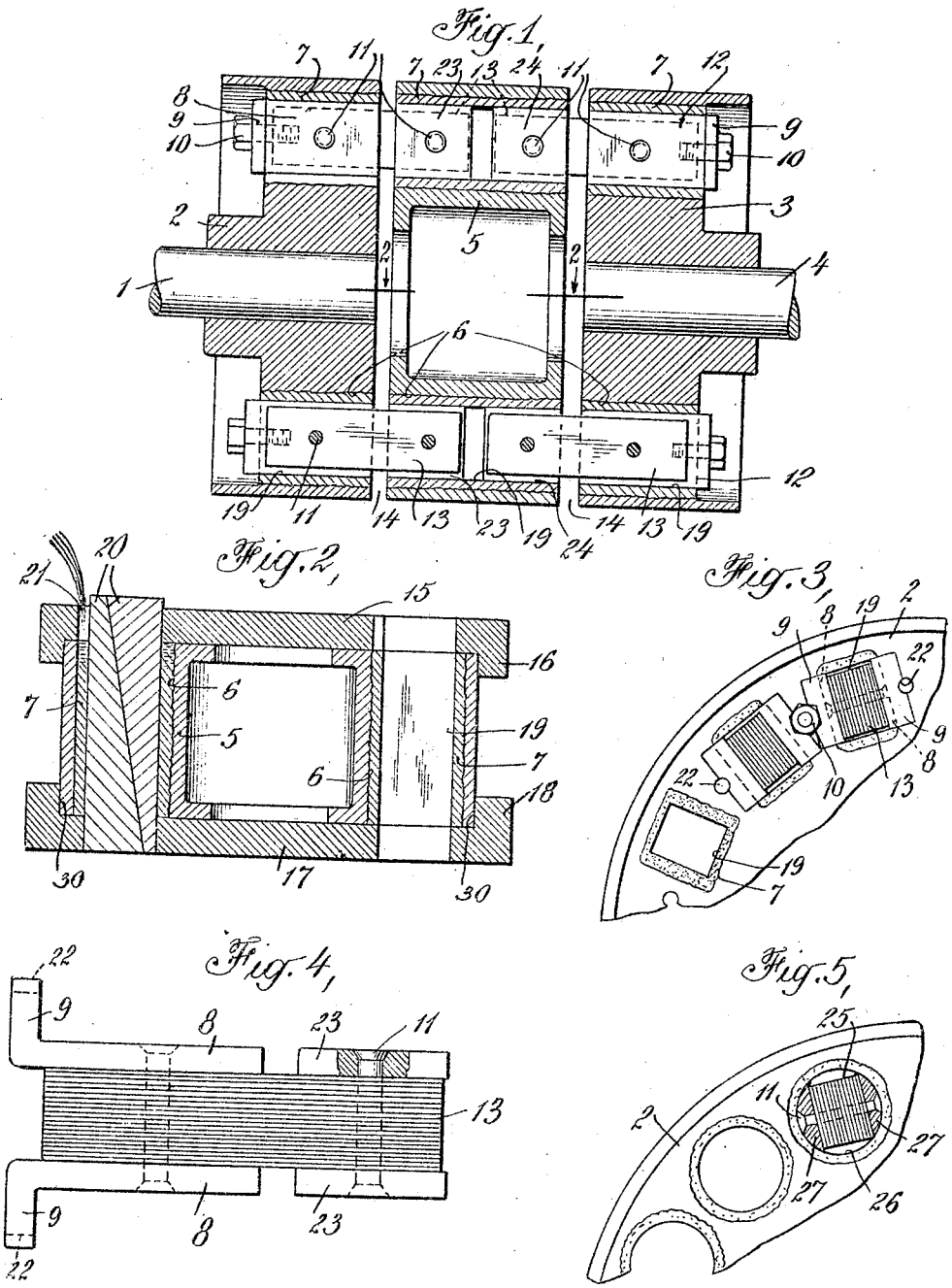

ROBERT A. SMITH, OF MAHWAH, NEW JERSEY, ASSIGNOR TO SMITH AND SERRELL, OF MAHWAH, NEW JERSEY, A COPARTNERSHIP CONSISTING OF ROBERT A. SMITH AND JOHN J. SERRELL.

PROCESS OF MAKING FLEXIBLE COUPLING MEMBERS, &c.

1,368,663.

Specification of Letters Patent.

Patented Feb. 15, 1921.

Original application filed August 4, 1919, Serial No. 315,060. Divided and this application filed May 3, 1920. Serial No. 378,610.

*To all whom it may concern:*

Be it known that I, ROBERT A. SMITH, a citizen of the United States, and resident of Mahwah, Bergen county, State of New Jersey, have made a certain new and useful Invention Relating to Processes of Making Flexible Coupling Members, &c., of which the following is a specification, taken in connection with the accompanying drawing, which forms part of the same.

The invention in this case, which is a division of my copending application, Serial No. 315,060, filed August 4, 1919, flexible couplings, that is, contains subject-matter taken therefrom, relates especially to processes of making flexible coupling members or the like in which the flanged or other coupling members adapted to be connected to the shafts and also in some cases an intermediate floating ring coupling member are cast or otherwise formed with rough recesses which may be conveniently cored out in the case of cast iron or steel coupling members. These coupling members may be externally turned or otherwise shaped before or after the recesses are lined and are preferably all finished to substantially the same external diameter and axial thickness adjacent the edge portions. Then by die casting or other special casting methods Babbitt or bearing metal cast in linings may be formed in the rough or cored recesses previously formed in the coupling members and securely and permanently retained in position therein, so that alined and sized bearing holes which may be of rectangular section are conveniently and accurately located in the coupling members, interchangeable jig plates and coöperating mandrels being preferably used in connection with the casting of these linings so as to accurately locate the same and insure exact correspondence of the bearing holes which are thus formed in different coöperating coupling members. While, of course, circular or other holes may be formed in this way, the method is of special value and utility in forming and accurately spacing and alining rectangular sectioned holes in the coupling members which are especially desirable for use in connection with rectangular sectioned resilient coupling pins comprising laminated spring elements and coöperating rigid bearing plates.

In the accompanying drawing showing in a somewhat diagrammatic way illustrative couplings formed by this method together with illustrative apparatus for producing the same, Figure 1 is a longitudinal section through one form of shaft coupling showing coöperating coupling members embodying this invention.

Fig. 2 is a transverse section through one of these coupling members taken substantially along the line 2—2 of Fig. 1 and illustrating the way in which the cast in linings may be formed.

Fig. 3 is a partial side view of one of the outer coupling members.

Fig. 4 is a view of one of the coupling pins, and

Fig. 5 is a side view showing a different form of bearing hole which may be formed in these coupling members by this process.

An illustrative form of coupling which may be made by this process is shown in Fig. 1 as comprising flange coupling members 2, 3, formed with keyed or other holes so as to be connected to the shafts 1, 4, and these uniform diameter coupling members may by this process be formed with coöperating bearing holes of rectangular or other suitable cross-section to accommodate the resilient coupling pins employed. The Babbitt metal or other lining 7 preferably forming these bearing holes is cast into the cored out or rough recesses 6 originally formed in the coupling members so as to accurately locate and finish the alined bearing holes. It is of course understood that the resilient coupling pins used may bridge directly across the coöperating bearing holes in these flange coupling members, or if desired, an interposed floating ring coupling member may be used between them formed with similarly spaced holes so that the resilient coupling pins may yieldingly connect the adjacent coupling members so as to give a still greater degree of yield between the two shafts.

These coupling members may be formed of blanks of cast iron, cast steel, etc., originally cast with enlarged cored out or roughly shaped recesses 6 generally corresponding in number and location to the holes for the coupling pins, and then by turning or otherwise shaping these cast metal blanks at least their lateral peripheral edge portions adjacent their flat faces may be accurately sized and preferably given the same diameter, and in many cases also it is advantageous to have the blanks or coupling members finished to substantially the same axial width or thickness. Babbitt metal or other suitable relatively fusible bearing metal linings may be cast, forced or otherwise located within these recesses so as to properly position and shape the bearing holes for the coupling pins. As indicated in Fig. 2, one of these coupling members 5 may have a bottom casting jig or plate 17 arranged in connection therewith and accurately located with respect thereto as by a locating flange or member 18, while a similar top plate 15 may have a locating flange or series of projections 16 similarly engaging the periphery of this coupling member. Suitable mandrels may extend through the holes in these plates so as to thus be accurately positioned with respect to the coupling member, and for instance, rectangular sectioned expanding mandrels 20 preferably formed with smooth or polished outer surfaces which may be lightly oiled or greased in some cases, may be simultaneously arranged and located in one or more of these recesses. A pouring or feeding opening 21 may of course be left in each case through which Babbitt or other bearing metal may as indicated in Fig. 2 be cast or forced into the recesses around these mandrels so as to form accurately positioned and sized and surfaced linings 7 for the coupling pins. After such linings are cast or formed the plates 15, 17 may be removed and then the mandrels may be taken out after in some cases first compressing the linings by slightly expanding the mandrels so as to form compressed bearing faces 19 against which the coupling pins may engage and thus also further smooth the bearing faces and more securely unite the linings to the coupling members. In this way rectangular sectioned holes may be effectively, quickly and cheaply formed for these resilient coupling pins and also a better and more efficient operation of the couplings secured because of the reduction of friction between these parts, especially under extreme conditions of lubrication.

Of course rectangular or square sectioned bearing holes are advantageous in coupling members of this type because as indicated in Fig. 4 the coöperating resilient coupling pins comprising laminated springs 13 may be more readily and efficiently given a rectangular cross-section in connection with bearing plates 8, 23, which may be secured on either side of the springs as by rivets 11. One of these sets of bearing plates may also be formed with integral securing flanges having bolt seats 22 to acommodate the securing bolts 10 which may thus readily secure the pins within these alined and sized bearing holes as shown in Figs. 1 and 3, it being understood, of course, that this invention is not limited to any particular constructional details of the coupling pins which may have a considerably greater length of exposed or free leaf springs especially in single type couplings.

As illustrated in Fig. 5 this method may also be used for forming and accurately alining and positioning cylindrical bearing holes in such coupling members. The blanks for these coupling members 2 may be originally cast or formed with enlarged cored recesses and then turned down or shaped so as to fit the casting jigs of the general type illustrated in connection with Fig. 2 which may support the cylindrical or other expanding mandrels around which these bearing metal linings may be cast into the cored recesses to form and accurately position the bearing holes 26 therein. Of course the coupling pins for such round holes are somewhat differently constructed and may have the leaf springs 25 held together by the cylindrical rigid bearing plates 27 and rivets 11, although, of course, other types of coupling pins may be used for such service.

This invention has been described in connection with a number of illustrative materials, arrangements, number and order of steps, methods of manufacture and use and illustrative shapes, forms, proportions and articles which may be made by these processes, to the details of which disclosure the invention is not of course to be limited, since what is claimed as new and what is desired to be secured by Letters Patent is set forth in the appended claims:

1. The process of making flexible coupling members or the like which comprises casting blanks for said coupling members with enlarged rough cored recesses, turning up and shaping said blanks, to substantially uniform outside edge diameter and axial width, assembling the shaped blanks together with casting jigs fitting their peripheral edges and with rectangular sectioned expanding mandrels located in said casting jigs and corresponding to the bearing holes to be formed in the coupling members, casting in Babbitt metal linings into said rough cored recesses and around said mandrels to accurately aline and locate said linings, removing said jig plates, expanding said mandrels to compress and smooth the bearing faces of said linings and accurately size the rectangular sectioned bearing holes thus formed in said coupling members for coöperation with resilient laminated spring coupling pins.

2. The process of making flexible coupling members or the like which comprises casting blanks for said coupling members with enlarged rough cored recesses, shaping said blanks to substantially uniform outside edge diameter, assembling the shaped blanks together with casting jigs fitting their peripheral edges and with rectangular sectioned expanding mandrels located in connection with said casting jigs and corresponding to the bearing holes to be formed in the coupling members, casting in bearing metal linings into said rough cored recesses and around said mandrels to accurately aline and locate said linings, removing said jig plates, expanding said mandrels to compress and smooth the bearing faces of said linings and accurately size the rectangular sectioned bearing holes thus formed in said coupling members for coöperation with resilient laminated spring coupling pins.

3. The process of making flexible coupling members or the like which comprises casting blanks for said coupling members with enlarged rough cored recesses, shaping said blanks, assembling the shaped blanks together with casting jigs fitting their peripheral edges and with rectangular sectioned expanding mandrels located in connection with said casting jigs and corresponding to the bearing holes to be formed in the coupling members, casting in bearing metal linings into said rough cored recesses and around said mandrels to accurately aline and locate said linings, the rectangular sectioned bearing holes thus formed in said coupling members being adapted for coöperation with resilient laminated spring coupling pins.

4. The process of making flexible coupling members or the like which comprises forming blanks for said coupling members with enlarged rough recesses, shaping said blanks to substantially uniform outside edge diameter, assembling the shaped blanks together with casting jigs fitting their peripheral edges and with rectangular sectioned expanding mandrels located in said casting jigs and corresponding to the bearing holes to be formed in the coupling members, casting in bearing metal linings into said rough recesses and around said mandrels to accurately aline and locate said linings, expanding said mandrels to compress and smooth the bearing faces of said linings and accurately form the rectangular sectioned bearing holes in said coupling members to adapt them for coöperation with resilient laminated spring coupling pins or the like.

5. The process of making flexible coupling members or the like which comprises forming blanks for said coupling members with enlarged rough recesses, shaping said blanks, assembling the shaped blanks together with casting jigs fitting their peripheral edges and with rectangular sectioned expanding mandrels located in said casting jigs and corresponding to the bearing holes to be formed in the coupling members, casting in bearing metal linings into said rough recesses and around said mandrels to accurately aline and locate said linings and form the rectangular sectioned bearing holes in said coupling members to adapt them for coöperation with resilient laminated spring coupling pins or the like.

6. The process of making flexible coupling members or the like which comprises forming blanks for said coupling members with enlarged recesses, assembling the blanks together with casting jigs and with rectangular sectioned expanding mandrels located in said casting jigs and corresponding to the bearing holes to be formed in the coupling members, casting in bearing metal linings into said recesses and around said mandrels to accurately aline and locate said linings and form the rectangular sectioned bearing holes in said coupling members to adapt them for coöperation with resilient laminated spring coupling pins or the like.

7. The process of making flexible coupling members or the like which comprises casting blanks for said coupling members with enlarged rough cored recesses, shaping said blanks to substantially uniform outside edge diameter, assembling the shaped blanks together with casting jigs and with expanding mandrels located in connection with said casting jigs and corresponding to the bearing holes to be formed in the coupling members, casting in Babbitt metal linings into said rough cored recesses and around said mandrels to accurately aline and locate said linings and size the bearing holes in said coupling members to adapt them for coöperation with resilient laminated spring coupling pins.

8. The process of making flexible coupling members or the like which comprises forming blanks for said coupling members with enlarged recesses, assembling the shaped blanks together with casting jigs and with mandrels located in connection with said casting jigs and corresponding to the bearing holes to be formed in the coupling members, casting in metal linings into said recesses and around said mandrels to accurately aline and locate said linings and size the bearing holes in said coupling members to adapt them for coöperation with resilient laminated spring coupling pins.

ROBERT A. SMITH.